United States Patent [19]

Sugita et al.

[11] Patent Number: 5,274,510
[45] Date of Patent: Dec. 28, 1993

[54] TRACK ADDRESS PATTERN FOR A DISK MEMORY APPARATUS

[75] Inventors: Junkichi Sugita; Masami Kashiwagi, both of Kanagawa, Japan

[73] Assignee: Sony Corporation, Tokyo, Japan

[21] Appl. No.: 703,200

[22] Filed: May 20, 1991

[30] Foreign Application Priority Data

May 21, 1990 [JP] Japan .................. 2-130745

[51] Int. Cl.$^5$ .................................. G11B 5/09
[52] U.S. Cl. .................... 360/49; 360/77.08; 360/48; 360/78.14
[58] Field of Search ............ 360/49, 48, 40, 77.08, 360/135, 78.14, 77.11, 75, 72.2, 57; 369/59

[56] References Cited

U.S. PATENT DOCUMENTS

| | | | |
|---|---|---|---|
| 4,032,984 | 6/1977 | Kaser et al. | 360/77.08 |
| 4,530,019 | 7/1985 | Penniman | 360/77.08 |
| 4,777,542 | 10/1988 | Ozaki | 360/48 |
| 4,823,212 | 4/1989 | Knowles et al. | 360/77.08 |
| 4,977,472 | 12/1990 | Volz et al. | 360/49 X |
| 5,047,880 | 9/1991 | Ohno | 360/77.08 X |

FOREIGN PATENT DOCUMENTS

| | | |
|---|---|---|
| 0269381A2 | 6/1988 | European Pat. Off. |
| 0295979A1 | 12/1988 | European Pat. Off. |
| 0335517A2 | 10/1989 | European Pat. Off. |
| 0353767A2 | 2/1990 | European Pat. Off. |

*Primary Examiner*—Robert J. Pascal
*Assistant Examiner*—Ali Neyzari
*Attorney, Agent, or Firm*—Philip M. Shaw, Jr.

[57] ABSTRACT

A track address pattern suitable for being applied to a magnetic disk apparatus which positions a head to a track with a desired address by a sector servo system, for example, wherein a gray code of a plurality of bits corresponding to a track address of the magnetic disk apparatus is divided per 2 bits thereof into groups, the respective groups of 2 bits are converted into codes of 3 bits (001), (010), (100) and (111) depending on the values thereof, respectively, whereby the converted codes are recorded on the magnetic disk as the track address pattern.

5 Claims, 14 Drawing Sheets

Phase Modulation

Dibit Conversion

Frequency Modulation

FIG.11

| Source Data | Channel Data | Reproduced Data |
|---|---|---|
| A1 A0 | B3 B2 B1 B0 | B3 B2 B1 B0 |
| 0  0 | 1  1  0  0 | >1  x  x  0 |
| 0  1 | 1  0  1  0 | >x  x  1  0 |
| 1  1 | 0  1  1  0 | >0  1  x  x |
| 1  0 | 0  1  0  1 | |

FIG.16

| Source Data | | | | Channel Data | | | | | |
|---|---|---|---|---|---|---|---|---|---|
| A3 | | | A0 | B5 | | | | | B0 |
| 0 | 0 | 0 | 0 | 0 | 0 | 0 | 1 | 0 | 1 |
| 0 | 0 | 0 | 1 | 0 | 0 | 0 | 1 | 1 | 0 |
| 0 | 0 | 1 | 1 | 0 | 0 | 1 | 0 | 1 | 0 |
| 0 | 0 | 1 | 0 | 0 | 0 | 1 | 0 | 0 | 1 |
| 0 | 1 | 1 | 0 | 0 | 1 | 0 | 0 | 0 | 1 |
| 0 | 1 | 1 | 1 | 0 | 1 | 0 | 0 | 1 | 0 |
| 0 | 1 | 0 | 1 | 0 | 1 | 1 | 1 | 1 | 0 |
| 0 | 1 | 0 | 0 | 0 | 1 | 1 | 1 | 0 | 1 |
| 1 | 1 | 0 | 0 | 1 | 0 | 1 | 1 | 0 | 1 |
| 1 | 1 | 0 | 1 | 1 | 0 | 1 | 1 | 1 | 0 |
| 1 | 1 | 1 | 1 | 1 | 0 | 0 | 0 | 1 | 0 |
| 1 | 1 | 1 | 0 | 1 | 0 | 0 | 0 | 0 | 1 |
| 1 | 0 | 1 | 0 | 1 | 1 | 1 | 0 | 0 | 1 |
| 1 | 0 | 1 | 1 | 1 | 1 | 1 | 0 | 1 | 0 |
| 1 | 0 | 0 | 1 | 1 | 1 | 0 | 1 | 1 | 0 |
| 1 | 0 | 0 | 0 | 1 | 1 | 0 | 1 | 0 | 1 |

TRACK ADDRESS PATTERN FOR A DISK MEMORY APPARATUS

BACKGROUND OF THE INVENTION

1. Field of the Invention

The present invention generally relates to track address patterns and, more particularly, is directed to a track address pattern for use with a disk memory apparatus which positions a head on a track having a target address according, for example, to the sector servo system.

2. Description of the Prior Art

As shown in FIG. 1, a magnetic disk MD used as a record medium by the magnetic disk apparatus, such as a so-called hard disk apparatus, a floppy disk apparatus and so on is divided along the radial direction (direction shown by an arrow R in FIG. 1) thereof to provide a plurality of tracks TR1, TR2, . . . , TRN. Also, the magnetic disk MD is divided along the circumferential direction (direction shown by an arrow $\phi$) thereof to provide a plurality of sectors 2A, 2B, . . . , whereby the recording or reproducing region can be specified by the track number (track address) and the sector number.

As a control method for positioning a recording/reproducing head on the magnetic disk along its radial direction so that the recording/reproducing head is maintained on the central axis of a track having a predetermined track address, a so-called sector servo system is known, in which normal data and positioning servo data are recorded on the recording surface of the magnetic disk in a time division fashion. More specifically, in the example of FIG. 1, areas between the sectors 2A, 2B, . . . are utilized as servo zones 1A, 1B, 1C, . . . and a track address for coarse positioning, a burst pattern for fine positioning or the like are recorded on these servo zones 1A, 1B, 1C, . . . , respectively.

A gray code is frequently utilized as the track address because only one bit is different in adjacent codes of the gray code so that, even when the head scans two tracks at a time, a value reproduced by the head can indicate the address of any -of the two tracks. Further, even when the head scans three tracks at a time in the high speed seek mode, a value reproduced by the head indicates the address of the track distant by two tracks at best from the center track. When the gray code is utilized as the track address of the magnetic disk, a code (source bit) must be converted into a channel bit by the modulation so as to satisfy the following two conditions.

Condition 1) When, for example, the magnetic flux inverted state is made corresponding with the high "1" level and the magnetic flux non-inverted state is made corresponding with the low "0" level in order to enable so-called self-clock to be made to form a clock from the reproduced data, the number (run length) of consecutive "0"s must be set to be less than a predetermined value in order to limit the recording length of the magnetic flux non-inverted state; and Condition 2) When the magnetic flux is inverted in the adjacent tracks at the same position along the circumferential direction, the magnetic flux must be inverted in the same direction in order to avoid the interference of magnetic flux and also to accurately detect the change of magnetic flux when the head scans these tracks.

As a modulation method for satisfying these conditions 1) and 2), a phase modulation (PM), a dibit conversion and a frequency modulation (FM) are known. In the phase modulation, as shown in FIG. 2A, low "0" level and high "1" level of the source bits are converted into two channel bits "01" and "10", respectively. In this case, the channel bit "0" corresponds to the state that the magnetic flux in one bit cell Ts on the recording track is not inverted while the channel bit "1" corresponds to the state the magnetic flux in one bit cell Ts on the recording track is inverted. Thus, two bit cells Ts constitute one cell on the recording track corresponding to one bit of the source code. Accordingly, the Hamming distance, which represents the number of different bits between address data recorded on the adjacent tracks, constantly becomes two channel bits to thereby satisfy the above conditions 1) and 2). Alternatively, the source bits "0" and "1" may be rendered to correspond to two channel bits "10" and "01", respectively. In this phase modulation, a code rate which is a ratio between the number of source bits and the number of channel bits, that is, a ratio of original data amount to data amount on the magnetic disk becomes 0.5.

In the dibit conversion, the source bits "0" and "1" are converted into two channel bits "00" and "11", respectively, as shown in FIG. 2B. However, in this dibit conversion, additional redundant data is required to satisfy the condition 2) (the run-length condition), making the code rate become smaller than 0.5.

In the frequency modulation, the source bits "0" and "1" are converted into two channel bits "10" and "11", respectively, as shown in FIG. 2C. However, in this frequency modulation, the magnetic flux inverted directions of the adjacent tracks are reversed as, for example, at a position P1 in FIG. 2C, so that the condition 2) can not be satisfied. To satisfy the condition 2), additional data is required, which unavoidably makes the code rate become smaller than 0.5.

As described above, of the conventional modulation methods, the phase modulation has the highest code rate and the conventional servo pattern utilizing the phase modulation described in U.S. Pat. No. 4,032,984 will be described with reference to FIGS. 3 and 4.

FIG. 3 shows the servo pattern, and as shown in FIG. 3, many tracks concentrically arranged in parallel are divided into servo tracks and data tracks in the circumferential direction, respectively. In this servo pattern of FIG. 3, magnetic flux is inverted in the respective servo tracks commonly at the synchronizing position P2 in the same direction; magnetic flux is inverted in every other tracks n, n+2, n+4, . . . , at the position P3 in the same direction; and magnetic flux is inverted in every other tracks n+1, n+3, n+5, . . . , at the position P4 in the same direction. Data at the positions P2, P3 and P4 form fine positioning servo data.

As shown in FIG. 3, cells A, B and C are provided after the position P4. Each of the cells A, B and C has two bit cells Ts having values "1" and "0" shown in FIG. 2A, and by these three cells A, B and C (six channel bits), gray codes of 3 bits 000 to 111 as track addresses (coarse positioning servo data) are phase-modulated and recorded.

FIG. 4 shows a reproduced signal reproduced by gradually moving the head from the servo track n to the servo track n+7 along the radial direction of the magnetic disk when the magnetic disk is rotated at high speed under the condition such that the gray codes 000, 001, 011, . . . , are made corresponding with the servo tracks n, n+1, n+2, . . . Since the reproduced signal is produced by differentiating the magnetic flux from a time standpoint, the reproduced signal becomes a positive or negative pulse at the magnetic flux inverted position in response to the magnetic flux inverted direction.

A servo circuit for processing the reproduced signal is supplied with the positive or negative pulse at the timing based on the synchronizing pulse at the synchronizing position P2 and generates track addresses and fine positioning data which will be described later. More specifically, when the reproducing head is located on the servo tracks n and n+1, detection codes (gray codes) 000 and 001 are detected as track addresses, and the track on which the reproducing head is located is specified by converting the detection codes into the ordinary binary codes. Further, when the reproducing head is located between the adjacent servo tracks n and n+1, the minimum digit of the detection code becomes value T of "0" or "1". Similarly, when the reproducing head is located between the two servo tracks, one bit of the detection code becomes the value T.

The reproducing head is finally positioned on the even-numbered address track as follows: After a detection head is moved to the position at which the pulse of the position P3 is large, the pulse of the position P4 is substantially zero and the detection code corresponds with the target even-numbered address, the reproducing head is moved in the direction in which the track address is increased to thereby adjust the pulses at the positions P3 and P4 to become substantially the same in level, thus the reproducing head being positioned at the boundary line between the adjacent servo tracks. Similarly, when the reproducing head is positioned to the odd-numbered address track, the detection head is moved to the position in which the pulse at the position P3 is substantially zero, the pulse at the position P4 is increased and the detection code corresponds to the target odd-numbered address so that boundary lines of the servo tracks correspond with center lines of data tracks d, d+1, d+2, respectively.

When the phase modulation is carried out as described above, the code rate becomes 0.5 and thus the track address can be recorded most efficiently. It is, moreover, advantageous that ordinary data can be recorded much more if the recorded length of the track address on the magnetic disk is reduced by making the code rate become close to 1 as much as possible.

Further, in the high speed seek mode, for example, the reproducing head obliquely scans the coarse positioning servo data areas in FIG. 4 so that, address can be reproduced with smaller error if the track address is compressed more in recording mode. Accordingly, by increasing the code rate of the track address in the recording mode, it is possible to reduce a time to seek a track having a desired address.

OBJECTS AND SUMMARY OF THE INVENTION

Accordingly, it is an object of the present invention to provide an improved track address pattern for a disk memory apparatus in which the aforenoted shortcomings and disadvantages encountered with the prior art can be eliminated.

More specifically, it is an object of the present invention to provide a track address pattern for a disk memory apparatus in which track address can be recorded at a code rate higher than that of the phase modulation system.

As a first aspect of the present invention, a track address pattern for a magnetic disk apparatus, wherein a gray code of plural bits corresponding to a track address of the magnetic disk apparatus is divided per 2 bits thereof into groups, the respective groups of 2 bits are converted into codes of 3 bits (001), (010), (100) or (111) depending on the value thereof, whereby the converted codes are recorded on the magnetic disk as the track address pattern.

As a second aspect of the present invention, a track address pattern for a magnetic disk apparatus, wherein a gray code of m bits (m is an integer not less than 2) corresponding to a track address of the magnetic disk apparatus is divided into a code Gx of one bit and codes (Gm−2, Gm−1, ..., G0) of (m−1) bits, and the code of 1 bit is converted into codes (C11, C10) of 2 bits according to a rule A and the codes of (m−1) bits are converted into codes (C2m−1, C2m−2, ..., C21, C20) of m bits according to a rule B, whereby a code which is converted from the gray code of m bits into a code of (m+2) bits is recorded on the magnetic disk as the track address pattern, the rule A making the code C1j (j=0, 1) correspond to Gx or Gx⊕1 (⊕ means an exclusive-or operation), and the rule B making the code C20 correspond to G0 or G0⊕1, the code C2j (j=1, ..., m−2) to G(j−1)⊕Gj or G(j−1)⊕Gj⊕1, the code C2m−1 to G(m−2) or G(m−2)⊕1, respectively.

In accordance with a third aspect of the present invention, a track address pattern for a magnetic disk apparatus, wherein a gray code of plural bits corresponding to a track address of the magnetic disk is divided into two sets, a code of one of the divided two sets is converted into a code according to a conversion rule recited in claim 1, a code of the other set is converted into a code according to the rule B recited in claim 2, and the two codes obtained by these conversions are combined to thereby be recorded on the magnetic disk as the track address pattern.

The above, and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIG. 11 is a diagram showing an example of the 2:4 conversion;

FIG. 16 is a diagram showing an example of the 4:6 conversion;

DETAILED DESCRIPTION OF THE PREFERRED EMBODIMENTS

Figure 1:
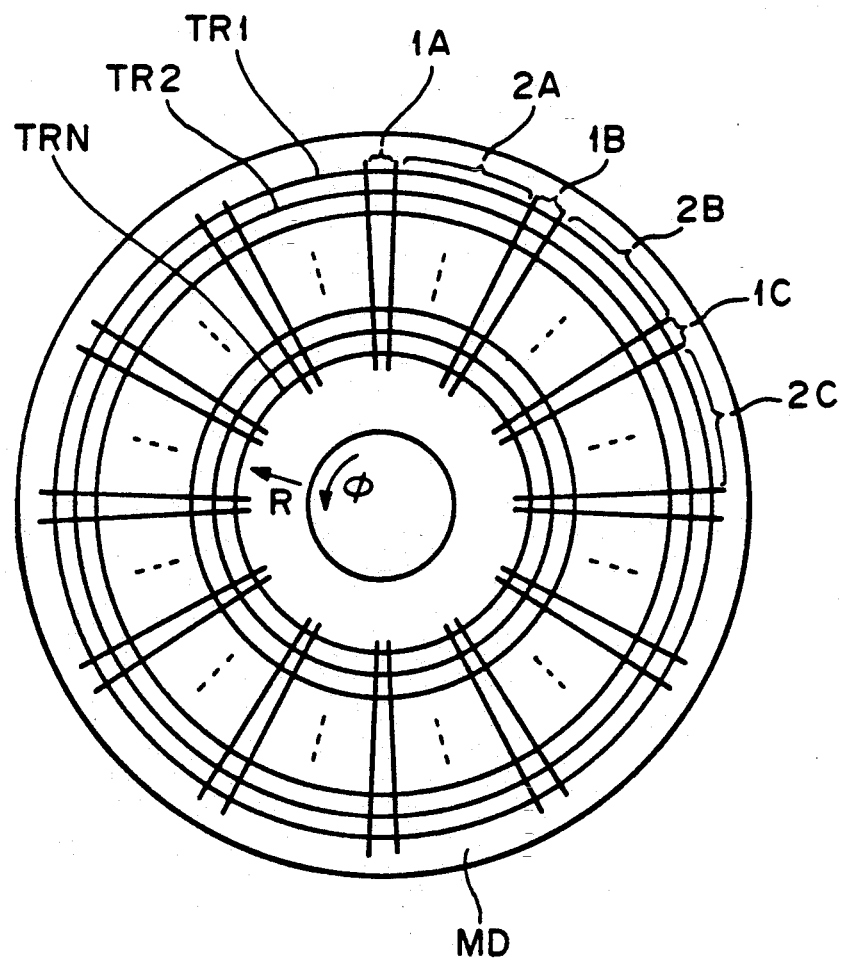
FIG. 1 is a diagram showing a format of a conventional magnetic disc.
Figure 2A:
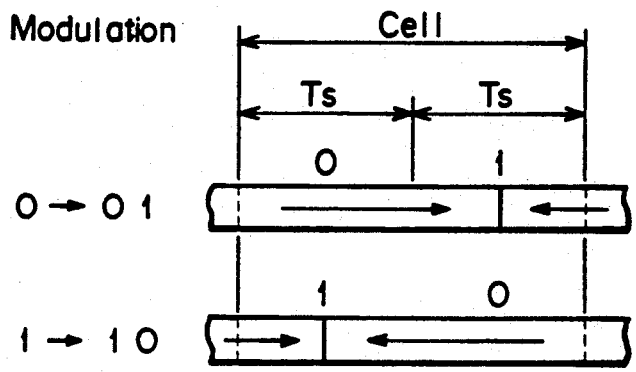
FIGS. 2A through 2C are diagrams, respectively, showing a conventional encoding method.
Figure 2B:
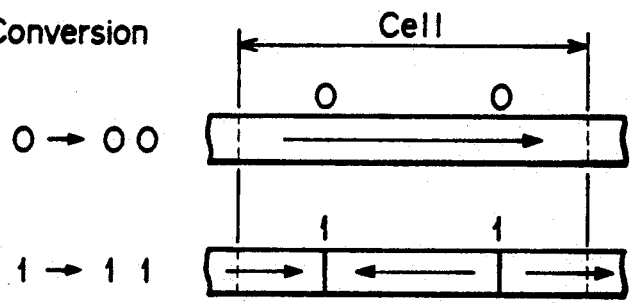
Figure 2C:
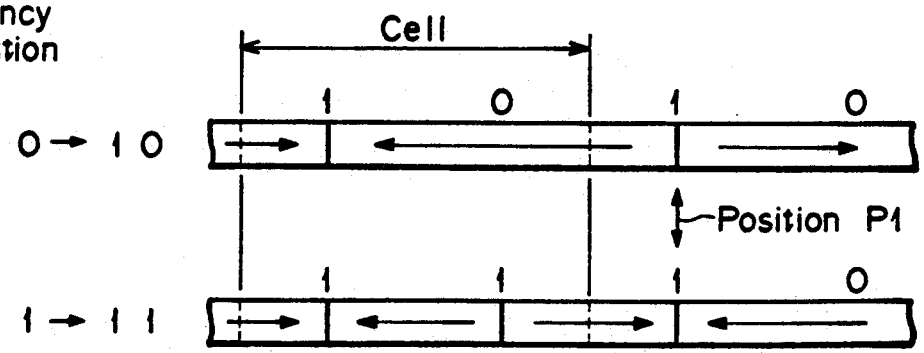
Figure 3:
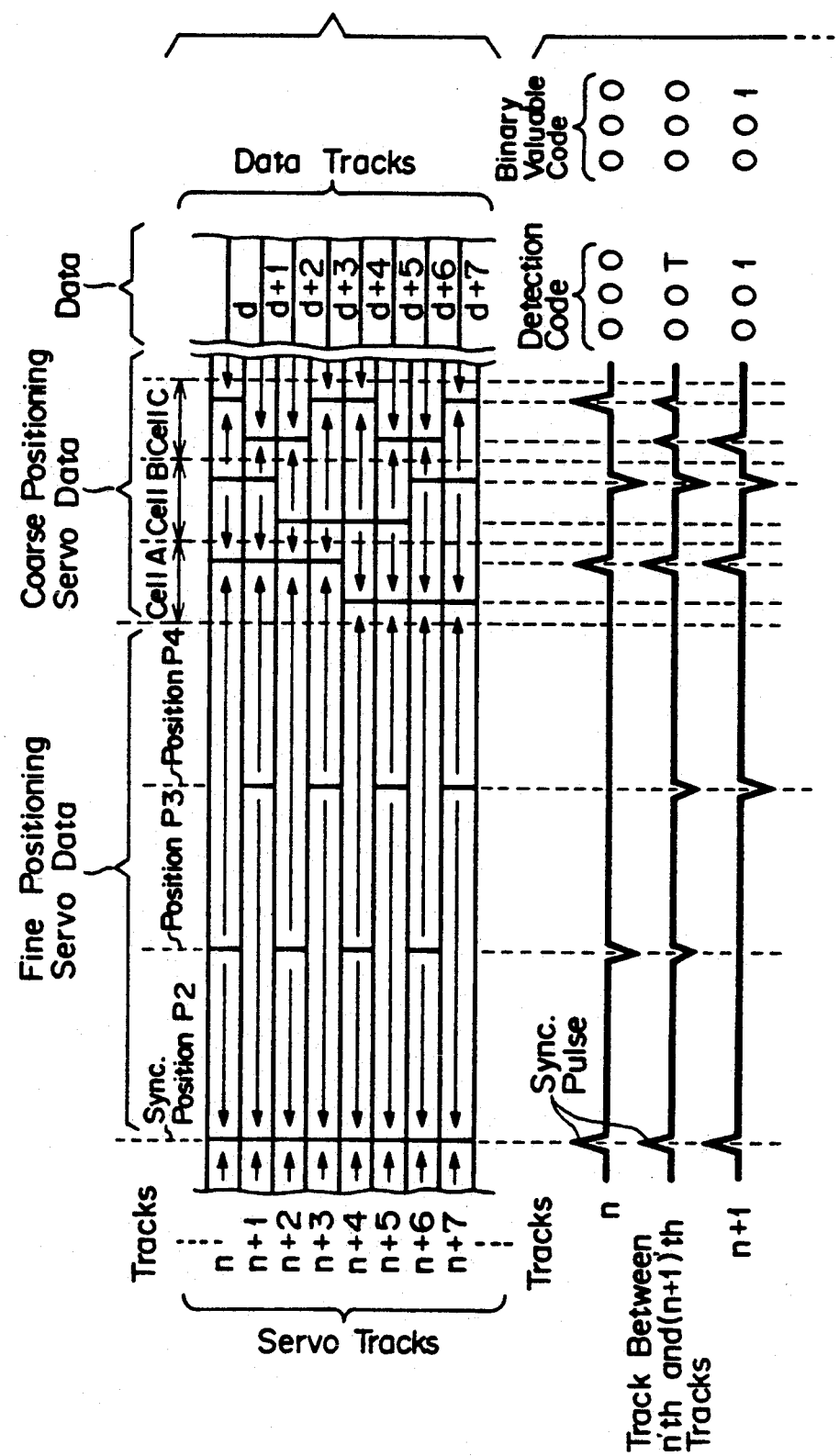
FIG. 3 is a plan view illustrating an example of a conventional servo pattern.
Figure 4:
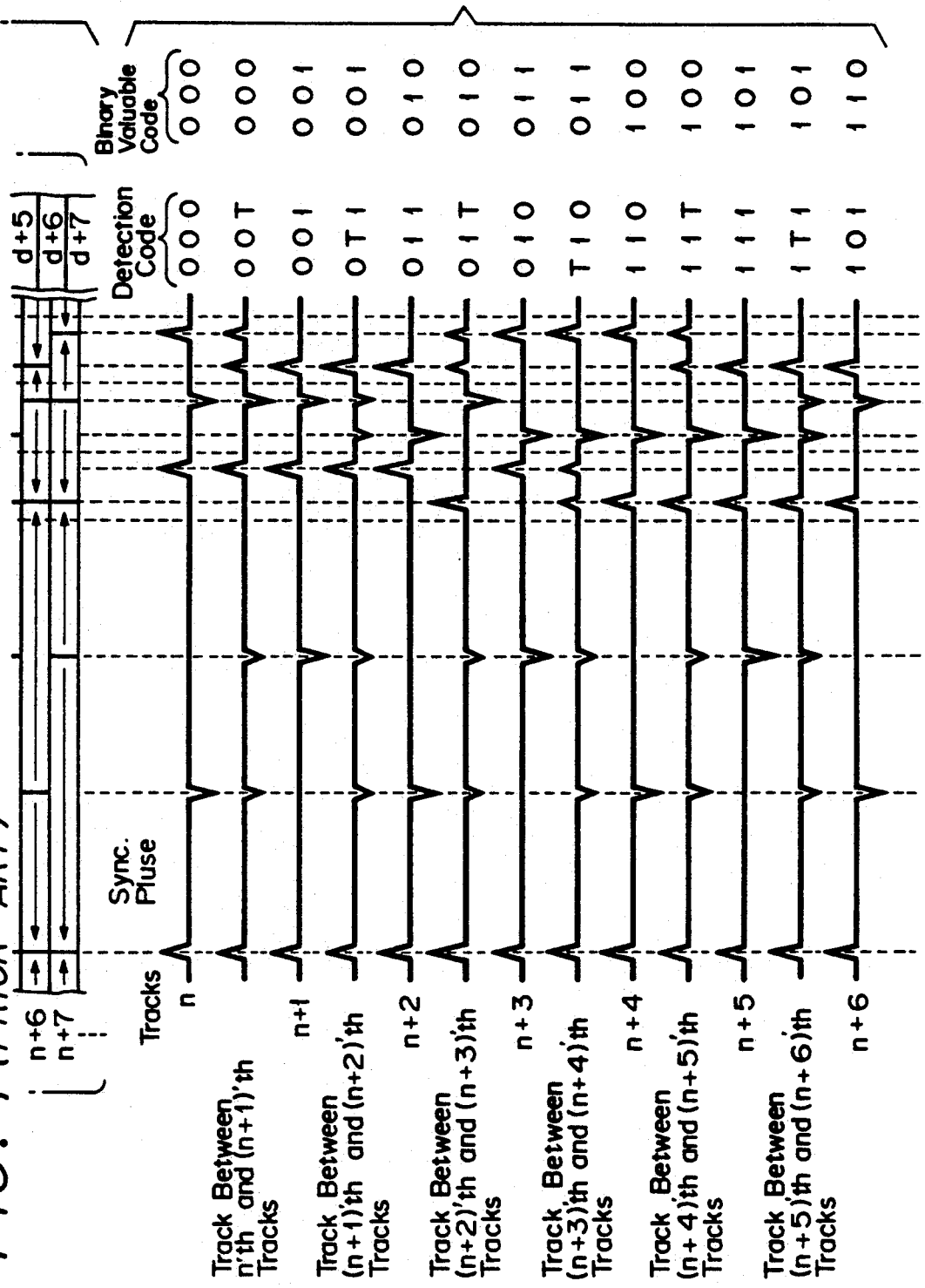
FIG. 4 is a timing chart showing a reproduced signal of the servo pattern shown in FIG. 3.

Referring to the drawings in detail and initially to FIGS. 5 to 11, a first embodiment of the present invention will be described in detail hereinafter. In this embodiment, the present invention is applied to a magnetic disk in which track addresses of 12 bits can be recorded as channel data of 18 bits by the two-to-three (2-3) conversion system and in which 4096 tracks can be directly accessed.

Figure 5:
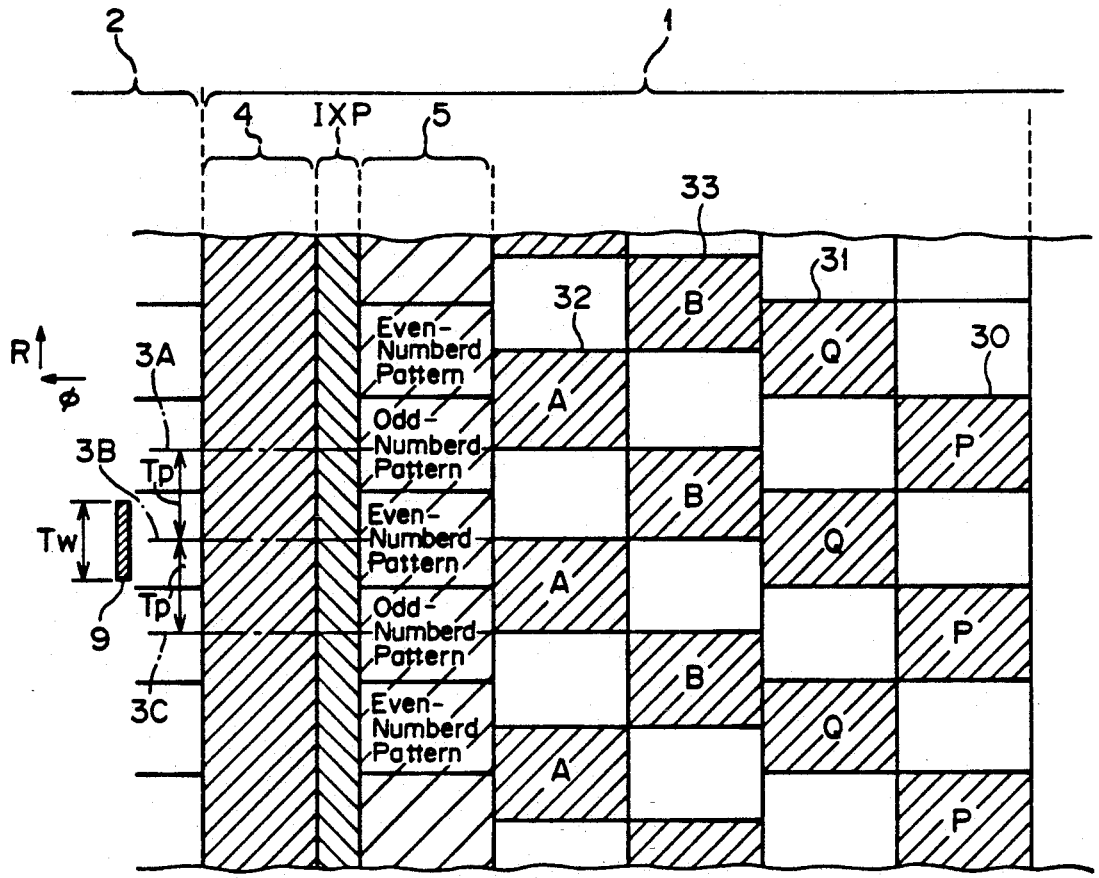
FIG. 5 is a plan view illustrating a servo pattern of an embodiment of the present invention.

FIG. 5 shows a servo pattern of the magnetic disk according to this embodiment. In FIG. 5, reference numeral 1 represents a servo zone, and 2 a sector where ordinary data is recorded. The magnetic disk is divided along the circumferential direction (direction shown by an arrow $\phi$ to provide a plurality of sectors 2 and the servo zone 1 is provided between adjacent sectors 2. The sector 2 is divided along the radial direction (direction shown by an arrow R) at a track pitch Tp to provide concentric and parallel tracks. Central axes of three tracks in the sector 2 are represented by 3A, 3B and 3C, respectively, and the track address of the central axis 3A is taken as an odd-numbered address. Reference numeral 9 designates a recording and/or reproducing head whose width is Tw (Tw<Tp).

The servo zone 1 is sequentially divided along the circumferential direction to provide a header 4 for detecting the servo zone 1, an index pattern IXP for discriminating the first sector from other sectors, an address pattern 5, a fine positioning pattern formed of four burst patterns 30 to 33 longitudinally arranged in the circumferential direction and the like. Assuming that Ts represent the length of bit cell in which one bit (channel bit) of the address pattern 5 is recorded, then 8Ts represents the length of the header 4, 9Ts represents the length of the index pattern IXP, and 18Ts represents the length of the address pattern 5 (see FIG. 8). The address pattern 5 is divided along the radial direction at the pitch Tp in association with each tracks of the sector 2 and the header 4 and the index pattern IXP are arranged to have the same pattern in the radial direction.

Of the burst patterns 30 to 33, the P-phase burst patterns 30 are formed along the central axes 3A, 3C, ... of the odd-numbered tracks at the width Tp; the Q-phase burst patterns 31 are formed along the central axes 3B, ... of the even-numbered address tracks at the width Tp; and the A-phase and B-phase burst pattern 32 and 33 are formed by displacing the P-phase burst pattern 30 and the Q-phase burst pattern 31 by Tp/2 in the positive direction of the radial direction. That is, the respective burst patterns 30 to 33 of the width Tp are formed entirely along the radial direction at every track pitch Tp without spacing and the burst patterns are formed along the circumferential direction by the magnetic flux inverted patterns. The regions encircled by these burst patterns 30 to 33 are demagnetized portions or magnetic flux non-inverted portions. In this case, since the burst patterns 30 to 33 are arranged in the radial direction at the pitch equal to 2Tp, the phases of the burst patterns 30, 31, 32 and 33 become 0°, 180°, 90° and −90° where 2Tp represents 360°.

Figure 6:
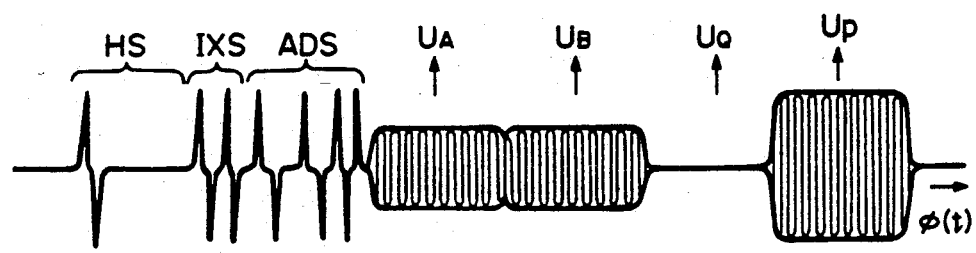
FIG. 6 is a diagram illustrating a reproduced signal obtained from the servo pattern shown in the embodiment of FIG. 5.

FIG. 6 shows an example of signals reproduced by the head 9 when the magnetic disk having the servo pattern of the example of FIG. 5 is rotated at high speed in the circumferential direction $\phi$. Referring to FIG. 6, fine positioning servo signals $U_A$, $U_B$, $U_Q$ and $U_P$ are produced by holding amplitudes of envelopes of the reproduced signals of the burst patterns 32 to 30 after index signals IXS corresponding to the index pattern IXP and address signals ADS are sequentially detected with reference to a time point t0 defined by a header signal HS which is obtained by reproducing the header 4. In FIG. 6, if the rotational speed of the disk in its circumferential direction $\phi$ is constant, then the abscissa $\phi$ can be regarded as time axis t.

Figure 7:
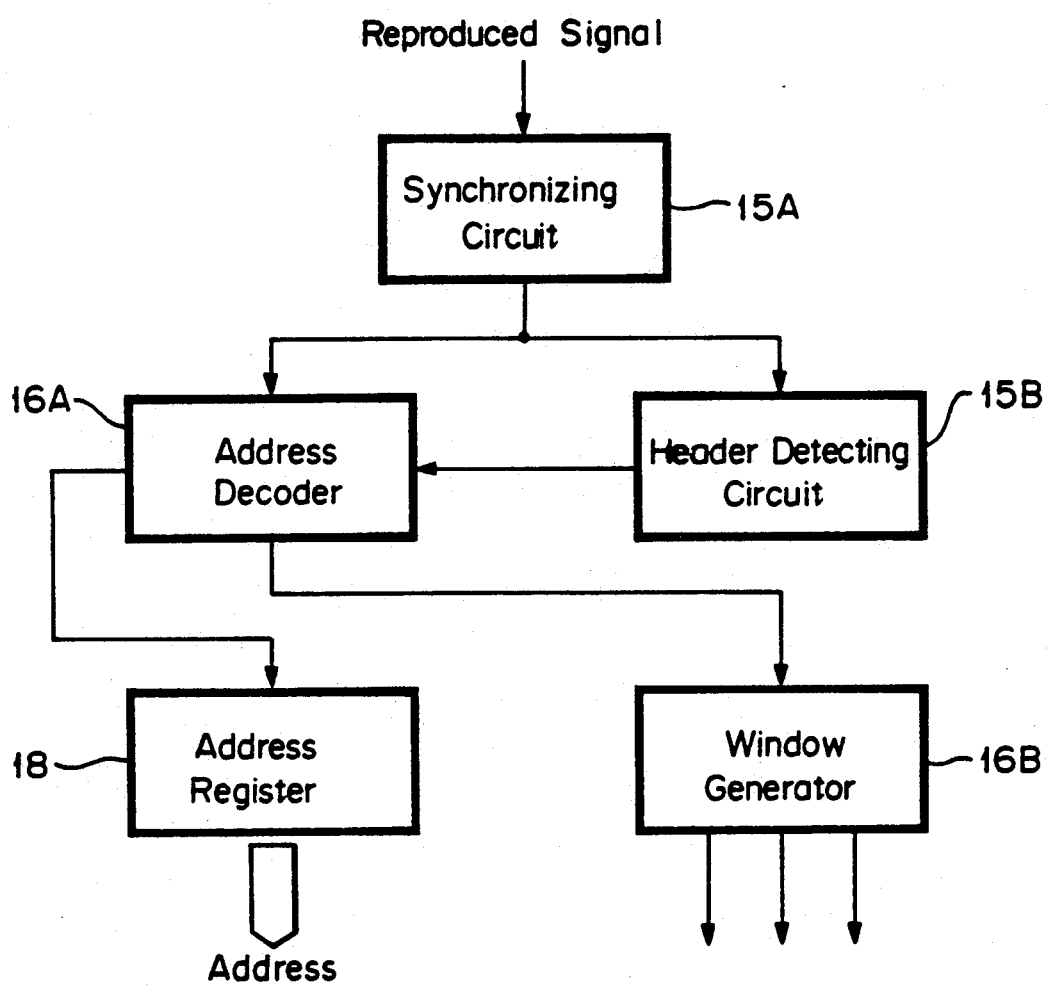
FIG. 7 is a schematic block diagram showing an arrangement of a detecting circuit which detects the servo pattern of the embodiment.

FIG. 7 shows a servo pattern detecting circuit of this embodiment. In FIG. 7, reference numeral 15A designates a synchronizing circuit which reproduces a clock pulse from the reproduced signal supplied thereto from the head 9 in the self-clock system and which supplies a reproduced clock pulse to a header detecting circuit 15B, an address decoder 16A or the like. The header detecting circuit 15B generates various timing pulses on the basis of the header signal HS detected from the reproduced signal and supplies the same to the address decoder 16A or the like. The address decoder 16A detects the index signal IXS and the address signal ADS on the basis of the timing pulse, and decodes the address signal ADS according to the processing, which will be described later, to obtain binary track address. The track address is supplied to an address register 18. Further, the address decoder 16A supplies a clock pulse reproduced from the address signal ADS to a window generating circuit 16B, and the window generating circuit 16B multiplies the frequency of the clock pulse by, for example, three times to generate a data detecting window signal.

Figure 8:
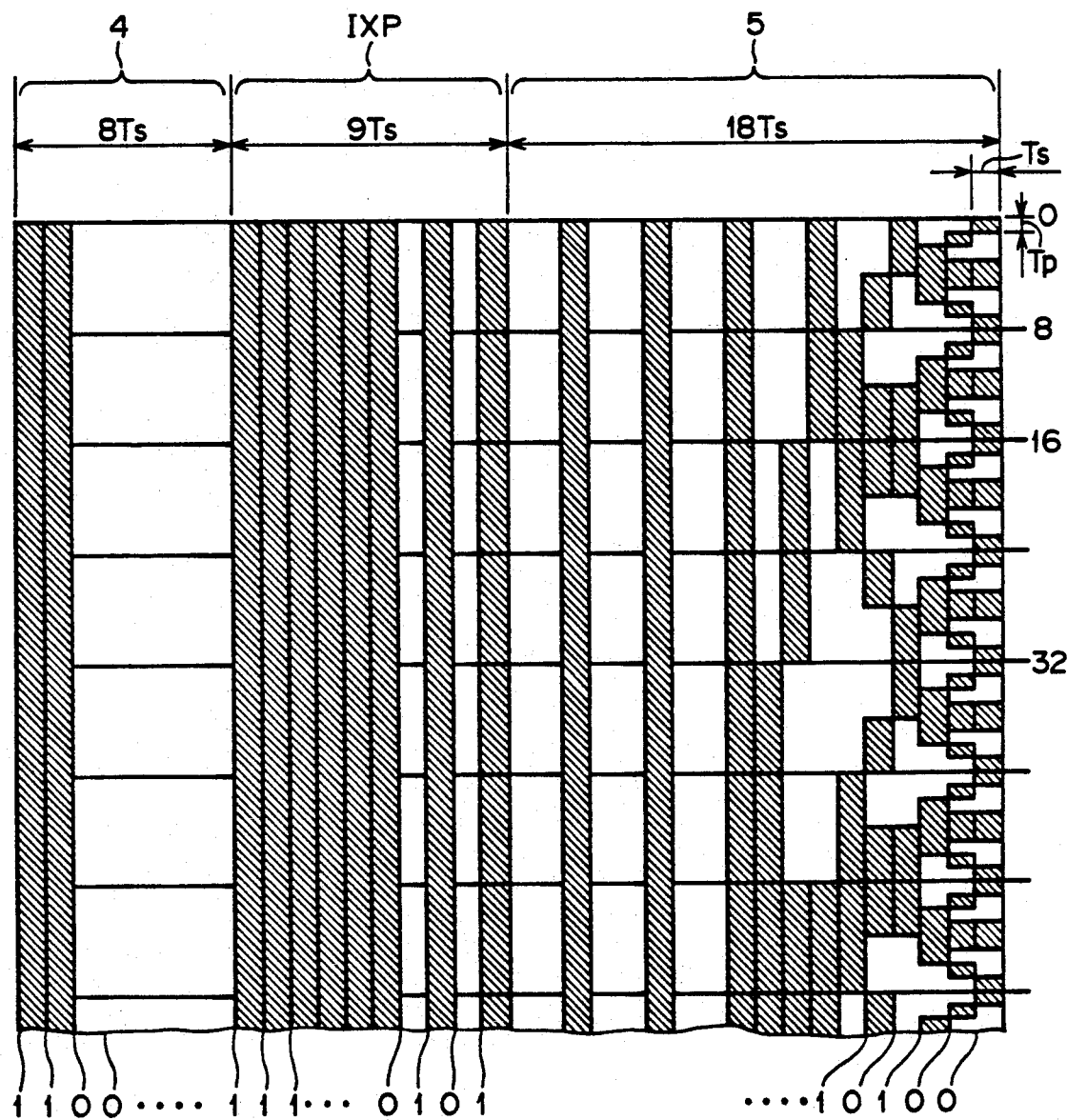
FIG. 8 is an enlarged view of the address pattern of the example shown in FIG. 5.

FIG. 8 shows in an enlarged scale the header 4, the index pattern IXP and the address pattern 5 of the example of FIG. 5. In FIG. 8, assuming that the magnetic flux inverted state (hatched area) at the starting portion of one bit cell Ts and the magnetic flux non-inverted state (blank portion) thereat respectively correspond with "1" and "0", then the pattern of the header 4 is represented as 1100 . . . , the first sector of the index pattern IXP is represented as 11 . . . 10110 and other sectors thereof are represented as 11 . . . 10101 and the pattern of the address pattern 5 is represented as channel data of 18 bits. The index pattern IXP can be utilized to synchronize bits and frames when the address pattern 5 is detected.

Figures 9, 10:
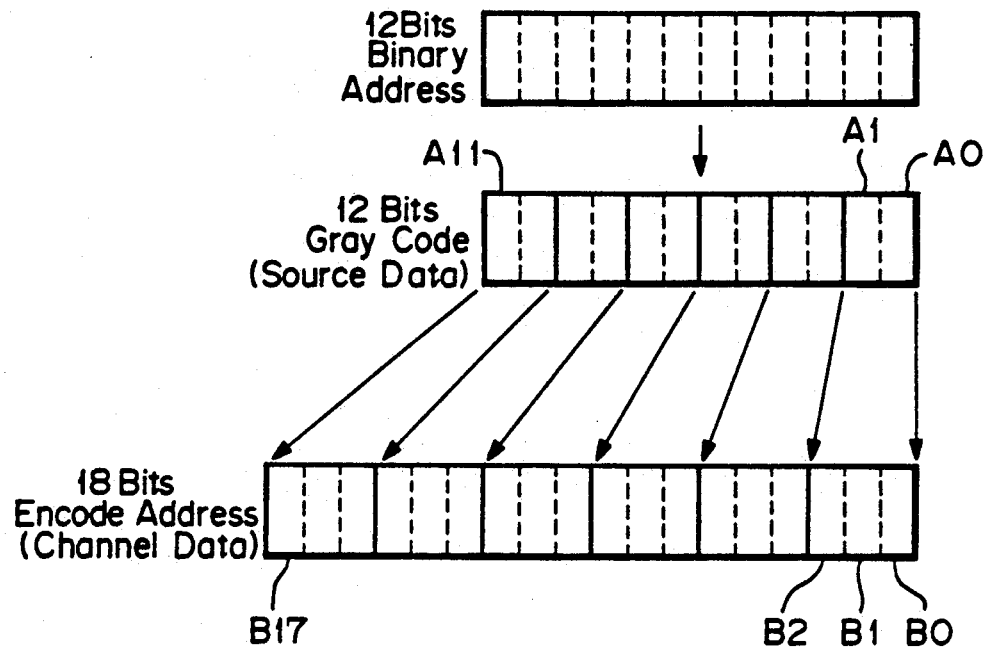
FIG. 9 is a diagram used to explain the 2:3 conversion of the embodiment.
FIG. 10 is a diagram showing an example of the 2:3 conversion.

The address pattern 5 is formed by modulating and recording binary addresses of 12 bits. In this embodiment, as shown in FIG. 9, the binary addresses of 12 bits are converted first into gray codes (A11, A10, ..., A1, A0) (source codes) of 12 bits. Then, the gray codes of 12 bits are divided at every 2 bits and codes of 2 bits are converted into channel data of 3 bits by the 2-3 conversion system, which will be described later, thereby generating encode addresses (B17, B16, ..., B1, B0) of 18 bits. The encode address is recorded on the corresponding area of the address pattern 5 of the magnetic disk.

FIG. 10 shows the 2-3 conversion table. As shown in FIG. 10, when the source data (A1, A0) of 2 bits are 00, 01, 11, 10, then 001, 010, 100, 111 are made corresponding with channel data (B2, B1, B0) of 3 bits where 2-bit source data of 4 kinds and 3-bit channel data of 4 kinds may be combined freely. According to this 2-3 conversion system, since the 3-bit channel data of 4 kinds constantly involve "1" (magnetic flux inverted state) of an odd number, the above condition 1) with respect to the run length can be satisfied. Also, since the magnetic flux can be prevented from being inverted in different direction between the adjacent tracks, the above condition 2) with respect to the magnetic flux inversion can be satisfied. Further, the length of the magnetic flux non-inverted state becomes longest when the channel data 100 and 001 are continued and the run length is 4 (channel bits).

According to this embodiment, the code rate which is the ratio between the bit number of the source data and the bit number of the channel data is 2:3, that is, substantially 0.67 and the code rate is high as compared with that of the prior art. Therefore, in this embodiment, the length of the address pattern 5 along the circumferential direction can be reduced relative to the same address amount, whereby ordinary data of much more amount can be recorded and error of address reproduced in the high speed seek mode can be reduced, which can make the high speed seek higher in speed. If the bit number of, for example, the gray codes is odd, the source data thereof may be divided into data of one bit and data of even-numbered bits and only the data of even-numbered bits may undergo the 2-3 conversion of this embodiment.

Further, having examined a method for decoding the source data (A1, A0) from the channel data (B2, B1, B0) of FIG. 10, it is to be noted that the conversion table of FIG. 10 can derive the following two equations:

$A1 = A2$ and $A0 =$ inversion of $B0$

Accordingly, the source data can be directly obtained from the values of channel data B2 and B0. Therefore, without utilizing the fine positioning 2-phase burst patterns 30 to 33 necessarily, the head 9 can be positioned on the track having the desired address with ease.

The Hamming distance (the number of different bits) of the channel data of adjacent two track addresses obtained by the 2-to-3 modulation is 2. Accordingly, if the address pattern is formed by the combinations of the example of FIG. 10, when the reproducing head scans the boundary line of adjacent two tracks in the high speed seek mode or the like, then channel data reproduced from the head 9 may involve two x as shown on the right column of FIG. 10 where x represents the bit of "1" or "0". By way of example, although 0xx on the upper right column of FIG. 10 represents 001, 010 or the like, it does not mean 100. That is, it is to be understood that reproduced address may involve error of ±1 track relative to the target address. In this embodiment, by utilizing the burst patterns 30 to 33 of FIG. 5, it is possible to specify the position of the head 9 in the radial direction of the disk within the range of ±1 track. This final positioning method will be described in the last stage.

The above 2-3 conversion system can be easily applied to a 2-4 conversion system shown in FIG. 11. In the example of FIG. 11, when 2-bit source data (A1, A0) of 4 kinds are 00, 01, 11 and 10, 1100, 1010, 0110 and 0101 are made corresponding with 4-bit channel data (B3, ..., B0), and the source data of 4 kinds and the channel data of 4 kinds may be combined freely. The conversion in FIG. 11 can satisfy both the condition 1) with respect to the run length and the condition 2) with respect to the magnetic flux inversion but this conversion is different from the conventional 1-2 conversion.

Accordingly, if the address pattern is formed by the combinations of the example of FIG. 11, when the reproducing head scans the boundary line of adjacent two tracks in the high speed seek mode, then channel data reproduced from the head 9 may involve two x as shown on the right column of FIG. 11 where x represents the bit of "1" or "0". In this case, however, 1xx0, for example, on the upper right of FIG. 11 may be modified by changing the combinations such that x exists on the bits B1 and B0.

A second embodiment of the present invention will be explained hereinafter with reference to FIGS. 12 to 17. In this embodiment, the above method of the first embodiment is expanded such that the gray code (source code) of m bits is converted into the channel code of n bits.

Figure 12:
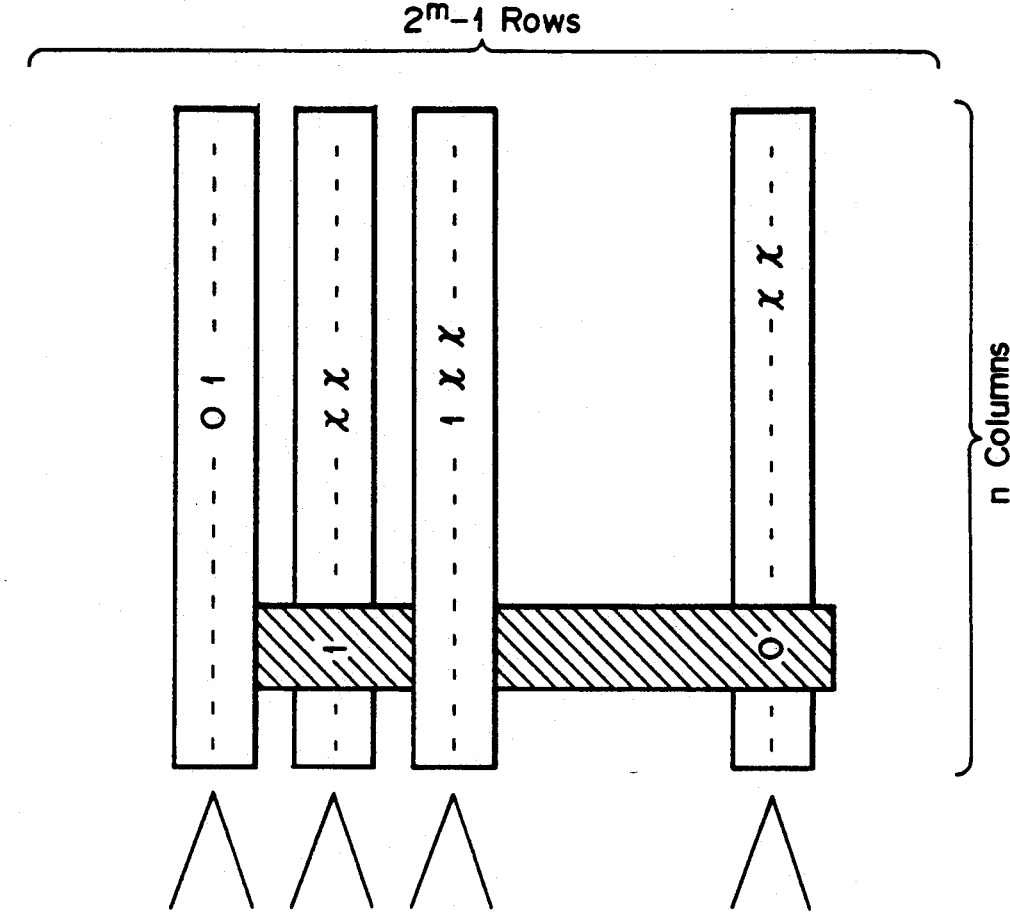
FIGS. 12 and 13 are diagrams showing an encode matrix and a reproduced matrix of the m:n conversion, respectively.

Since there are generally m-bit gray codes of $2^m$ number, the encode matrix of m-n conversion can be represented by a matrix of $2^m$ rows x n columns wherein each element thereof is 0 or 1 as shown in FIG. 12. Further, judging from the examples of FIGS. 10 and 11, it is to be understood that, when the head cans the boundary line of the adjacent two tracks in the embodiment of FIG. 12, then channel data reproduced is expressed by a reproducing matrix of $(2^m - 1)$ rows x n columns shown in FIG. 13. Each element of this reproducing matrix is 0, 1 or x, and x represents an indefinite value of 0 or 1. If the encode matrix is determined, then the reproducing matrix will be uniquely determined accordingly. Conversely, the encode matrix will be uniquely determined from the reproducing matrix.

Figure 13:
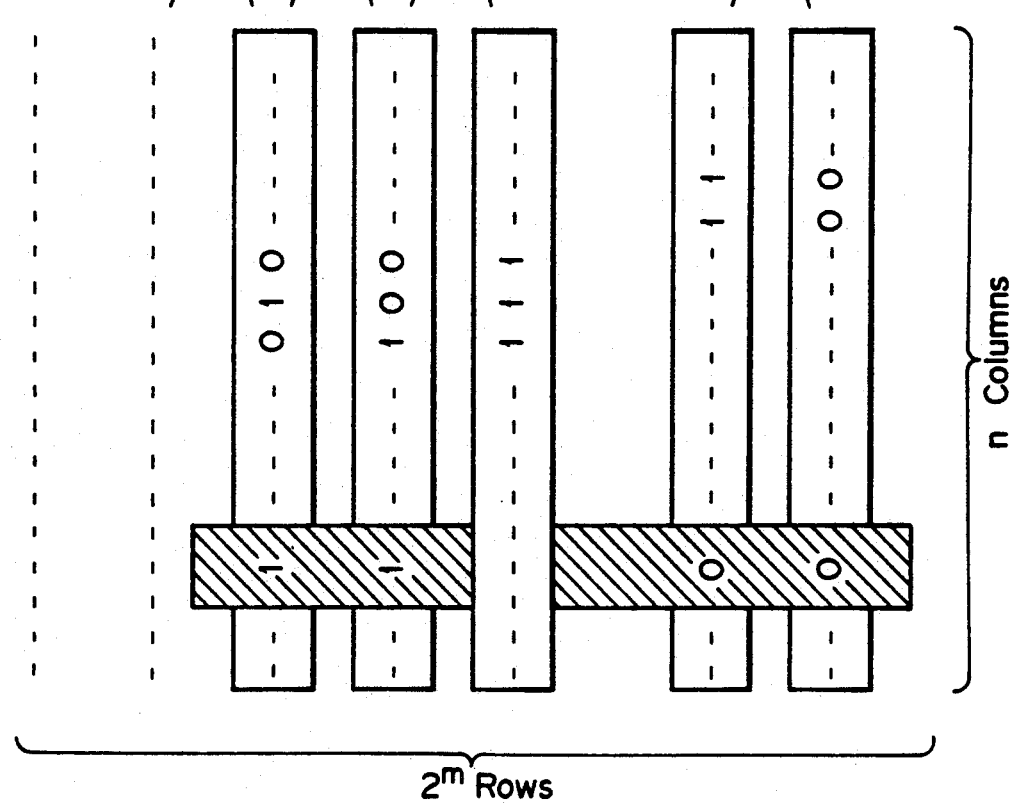

From FIGS. 12 and 13 representing general forms of the encode matrix and the reproducing matrix, the following features of the reproducing matrix will be judged.

1. Each row of the reproduced matrix includes two xs, that is, the Hamming distance of each code from the adjacent codes is 2. Further, only one "0" can be inserted between these two xs. The reason for this is that, when these two xs are separated by "1", there is then the risk that the magnetic flux may be inverted at the position "1" in the opposite direction under the condition that the first magnetization direction is the same (see FIG. 8).

2. In each column of the reproducing matrix, the element value alternately changes from "1" to "0" and vice versa when the element x appears. In other words, even number of xs exist between two "1"s (or "0"s) on a certain column, and an odd number of xs exists between "1" and "0" on the column.

3. In the reproducing matrix, a value of k'th bit of r'th row is determined to be "1" or "0", and if this value is different from a value of k'th bit of rd'th row, a code of the r'th row or (r+1)'th row can be identified from this bit and a code of the rd'th row or the (rd+1)'th row. In other words, any pair of row except for adjacent two rows differ in bits of one column thereof. However, there is not such bits in-between adjacent two rows. This is because, between these two rows, there must be at least one other row having a value x as the bit of the one row thereof.

These features are necessary conditions, but if such a condition is added to the necessary conditions that any one of codes includes "1", it will be easily ascertained that the conditions including the necessary conditions and the additive condition become sufficient conditions. Further, from these features, it is understood that the reproducing matrix and hence the encode matrix can be formed from the following steps A−C.

Step A. Two xs are disposed in each row, and, between two bits except for x respectively existing on a row of any two rows not being adjacent to each other, an odd number of rows having a value x on the row are disposed between any two rows In this case, the bit of one of any two rows becomes "0" and that of the other row becomes "1" and so these two rows can be discriminated from each other. Further, only "0" may be inserted between the two xs on the row.

Step B. The first row of the encode matrix is determined. By setting an odd number of "1"s in any one of codes, the number of "1" also becomes an odd number in each of remaining codes, so that the condition 1) relating to the run-length can be satisfied.

Step C. Any bit on the second row of the encode matrix will be equal to the corresponding bit of the first row thereof if the corresponding bit on the first row of the reproducing matrix is not x. On the other hand, if the corresponding bit on the first row of the reproducing matrix is x, the bit on the second row of the encode matrix will be inverted. The entire encode matrix is completed by repeating these processes.

Let us consider a value of n which satisfies the above-described conditions with respect to a given m when m−n conversion is carried out. Further, investigation will be made about a systematic method for obtaining a value x in the reproducing matrix.

Figures 14, 15:
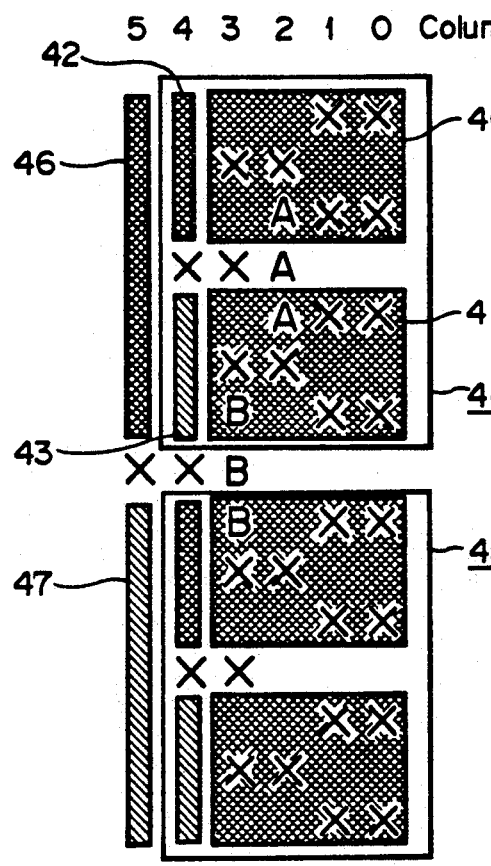
FIG. 14 is a diagram showing an example of a method of forming the reproduced matrix.
FIG. 15 is a diagram showing an example of a method of decoding the reproduced matrix.

A method of forming the reproducing matrix will be explained with reference to FIG. 14. As shown in FIG. 14, a reproducing matrix 40 of 3 rows×4 columns for an encode matrix of the two-to-four modulation is prepared as shown within a gray box (cross-hatched box). Similarly, a reproducing matrix 41 of 3 rows×4 columns is prepared, and not only one row is added between these two reproducing matrices but also columns 42 and 43 are added to most significant bits (MSBs) of these matrices respectively, thereby forming a reproducing matrix 44 by combining these two reproducing matrices 40 and 41. The two most significant bits (MSBs) of the inserted row is "xx".

The inserted most significant bits separate the upper half from the lower half of the combined reproducing matrix 44 and so any row of the upper half can be discriminated from the row of the lower half. (Values of the column 42 shown by the cross-hatched box differ from values of the column 43 shown by a hatched box).

The values of the bits 0 and 1 of the inserted row are inverted values of the corresponding bits of the central rows of the combined upper and lower reproducing matrices, respectively. It is clear that the bit 2 of the central row (shown by a mark A) is different from the first row of the upper reproducing matrix and the last row of the lower reproducing matrix.

By the above-described processes, the reproducing matrix 44 of 7 rows×5 columns corresponding to the table of a three-to-five conversion is introduced. Another reproducing matrix 45 of 7 rows×5 columns is formed in the same manner, and one row is inserted between these reproducing matrices 44 and 45 and further rows 46 and 47 are added to the most significant bits of these reproducing matrices 44 and 45 respectively, thereby forming a reproducing matrix of 15 rows×6 columns. This reproducing matrix corresponds to a four-to-six conversion, that is, the case of converting the source code of 4 bits into the channel code of 6 bits.

The decoding method will be explained hereinafter with reference to FIG. 15. When the head crosses a boundary region of adjacent two tracks, adjacent two bits can not be identified accurately. The decoded track address may be any one address of these two tracks. If one of these two bits corresponds to an address of one of these tracks and the other bit corresponds to an address of the other track, then the decoded address values becomes erroneous and so it is required to detect the erroneous state.

To this end, at first, the number of "1" is fixed to an odd number or an even number, and so the generation of the erroneous state can be detected by counting the number of "1". Next, when the occurrence of the error is detected, the error will be two least significant bits (LSBs). These two bits take different values at every two tracks, so that it is possible to determine whether or not error exists in these two bits by counting the number of "1" in these two bits. If the error is detected in these two bits, then any one of these two bits is inverted.

Further, it is considered that there is a case where an error exists in the bit 2 or the bit 3. This is a case where an error occurs at rows 2, 6, 10 and 14 as shown in FIG. 15. The bits 0 and 1 within cross-hatched box of each of these rows take the same value but take different values from the values of other rows. If the bits 0 and 1 take these values, then the error exists at the bit 2 or 3. Further, if the decoded three least significant bits (LSBs) take values within a hatched box, then the error exists at the bit 4 or 5. By repeating these processes, not only the error position can be determined but also the error can be corrected.

Figure 17:
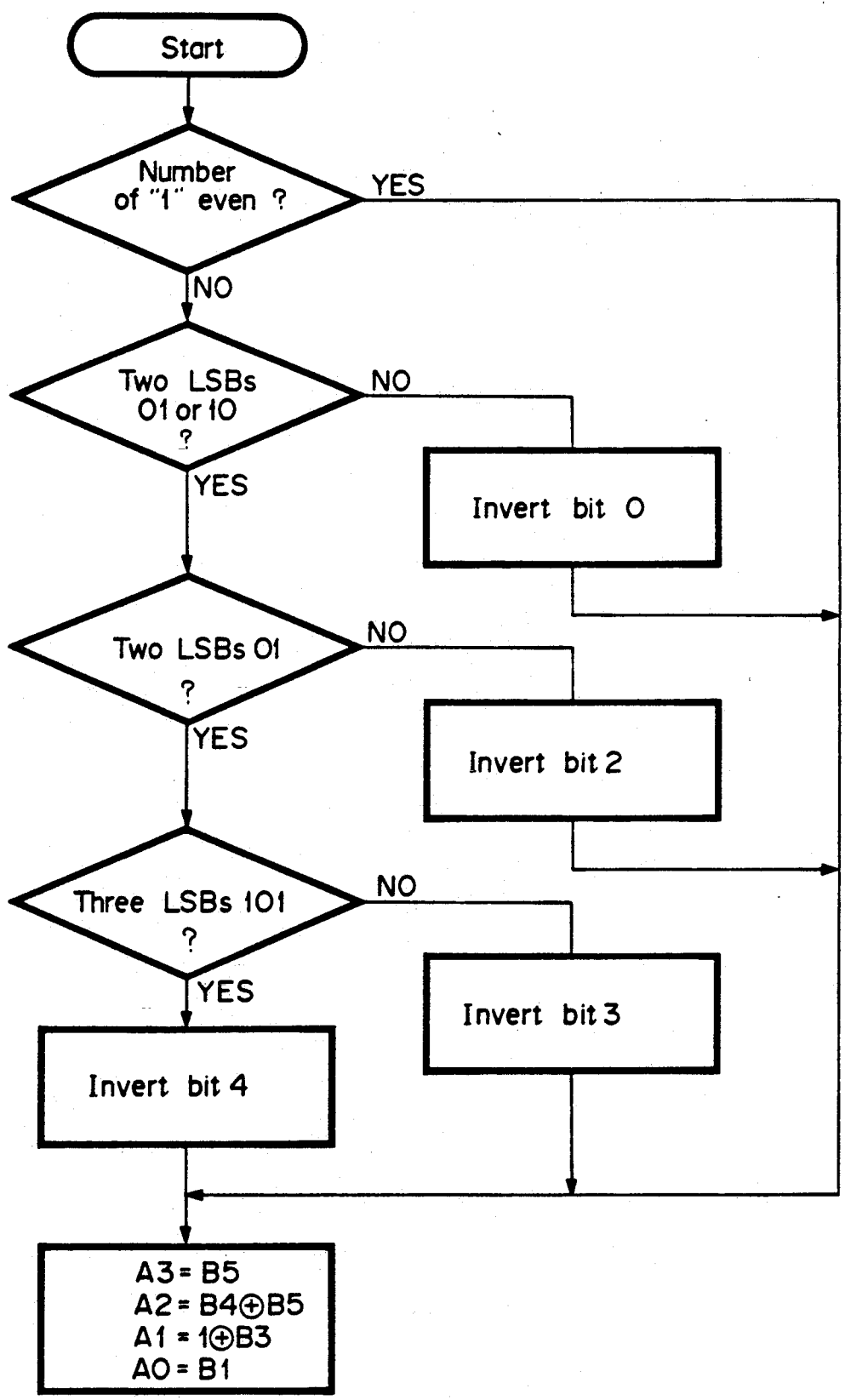
FIG. 17 is a flowchart to which references will be made in explaining the decoding procedure of the example of FIG. 16.

An example of result of an encode matrix obtained by the above-described method in case of the four-to-six conversion is shown in FIG. 16. As shown in FIG. 16, each of 16 kinds of source data of 4 bits (gray code) (A3, A2, A1, A0) are converted into channel data of 6 bits (B5, . . . , B0). Further, a procedure of decoding the original source data of 4 bits from the channel data of 6 bits reproduced by the head will be explained with reference to a flowchart of FIG. 17. In FIG. 17, an operator ⊕ represents the exclusive-OR operation, and the case that the number of "1"s is not an even number represents a state where an error of one bit is mixed into the reproduced data because the head crosses a boundary region of adjacent two tracks. Now, both the bit 0 (B0) and the bit 2 (B2) are not used for the decoding of the source data, so that steps of inversion of these bits 0 and 2 can be eliminated and further the decoding operation can be performed by using a read only memory (ROM) for the conversion.

Even if one bit error mixed into the reproduced data exists in any bit of the LSB or MSB of the channel data, then the maximum value of the error at the final binary data becomes one least significant bit (1LSB) because the original source code is the gray code.

The four-to-six modulation of FIG. 16 can be considered as a product code of the one-to-two conversion based on a rule a and the three-to-four conversion based on a rule b.

More specifically, assuming that the source data is divided into a code A0 of one bit and a code (A3, A2, A1) of three bits and the channel data is divided into a code (C10, C11) of two bits and a code (C23, ..., C20) of four bits, these rules a and b can be represented as follows where the operator $\oplus$ represents the exclusive-OR operation.

Rule a
C10 = B10 = A0 $\oplus$ 1
C11 = B1 = A0
Rule b
C20 = B2 = A1 $\oplus$ 1
C21 = B3 = A1 $\oplus$ A2
C22 = B4 = A2 $\oplus$ A3
C23 = B5 = A3

If these rules are generalized, a channel data of (m+2) bits can be obtained easily from a source code of m bits (m is an integer not less than 2), by dividing the source code (gray code) of m bits into a code Gx of one bit and a code (Gm-2, Gm-1, ..., G0) of m−1) bits, and by not only converting the code of one bit into a code (C11, C10) of two bits according to a Rule A but also converting the code of (m−1) bits into a code (C2m−1, C2m−2, ..., C21, C20) of m bits. These rules are as follow.

Rule A
C10 = Gx            Gx $\oplus$ 1
C11 = Gx            Gx $\oplus$ 1
Rule B
C20 = G0            G0 $\oplus$ 1
C21 = G0 $\oplus$ G1     G0 $\oplus$ G1 $\oplus$ 1
C22 = G1 $\oplus$ G2     G1 $\oplus$ G2 $\oplus$ 1
.                   .
.                   .
.                   .
C2m − 2 = Gm − 3 $\oplus$ Gm − 2   Gm − 3 $\oplus$ Gm − 2 $\oplus$ 1
C2m − 1 = Gm − 2              Gm − 2 $\oplus$ 1

In these rules A and B, two equations shown on the right and left sides are respectively allotted to each bit of the codes C1i and C2j, but any code composed of any combination of the equations shown on the right and left sides may be used. However, at least in the rule A or B, it is required to use odd number of equations on the right hand in order to perform the self clock. This requirement corresponds to a fact that conditions for performing the self clock can be satisfied even if any codes are used as long as odd number of "1" is included in the first code.

In case of converting a source code of m bits into a channel data of (m+2) bits, a code rate becomes m/(m+2), while this code rate is more than 0.5 and gradually approaches to 1 as the value m is increased.

Further, by using a product code of the encode codes obtained by the two-to-three conversion explained with reference to FIG. 10 and the encode codes obtained by the above-described rule B, it is generally possible to convert the gray code of (2n+m) bits into the channel code of (3n+m+1) bits satisfying the necessary conditions. In this case, assuming that minimum values of n and m are 1 and 1, respectively, then the code rate becomes (2n+m)/(3n+m+1). That is, the code rate gradually approaches to 1 as it increases more than about 3/5 and the value m becomes larger.

Figure 18A:
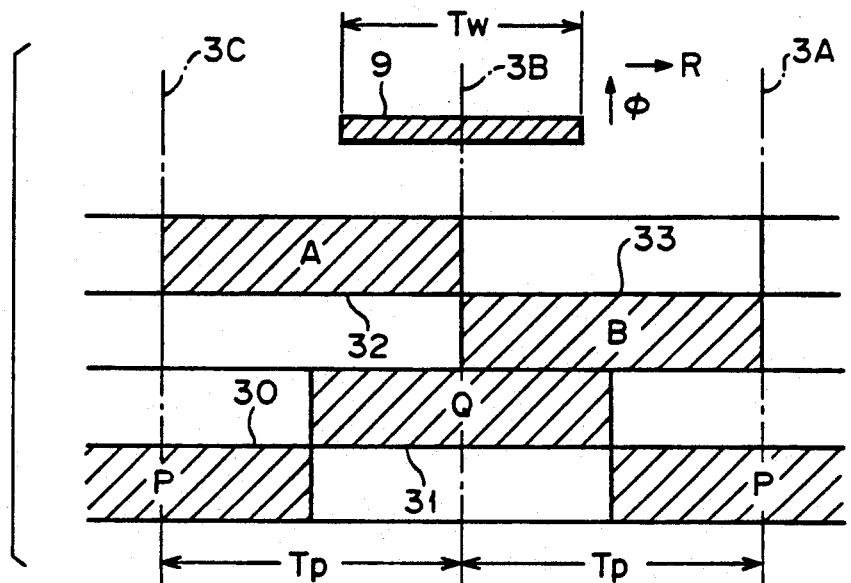
FIGS. 18A and 18B are schematic diagrams used to explain the process for generating a narrow-range track position signal.

An example of method of using the servo patterns 30-33 shown in FIG. 5 will be explained with reference to FIGS. 18A and 18B. In this case, the servo signals $U_A$, $U_B$, $U_Q$, $U_P$ of the servo patterns 32, 33, 31, 30 are respectively obtained (refer to FIG. 6) by sampling and holding an amplitude of an envelope of signals which are reproduced by the magnetic head tracing the servo patterns on the magnetic disk rotated in the direction $\phi$ as shown in FIG. 18A.

Next, two-phase narrow-range track position signals $U_X$ and $U_Y$ are obtained on the basis of the following equations by using a value k (=Tw/Tp) which is a ratio between a head width Tw and a track pitch Tp.

$$U_X = k(U_A - U_B)/(U_A + U_B)$$

$$U_Y = k(U_Q - U_P)/(U_Q + U_P)$$

Figure 18B:
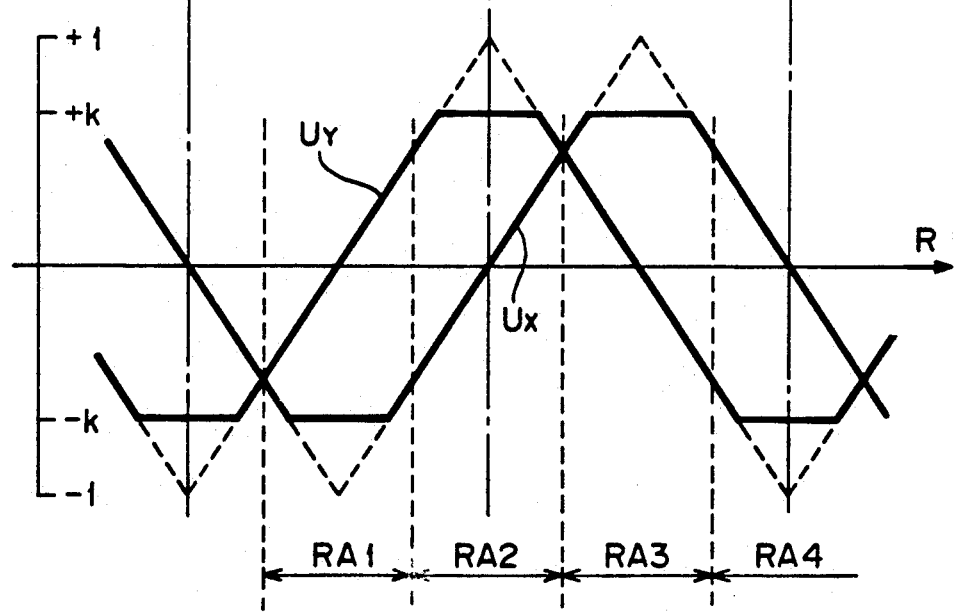

These position signals $U_X$ and $U_Y$ change periodically with a period 2Tp (=360°) as a function of position of the head 9 in the radial direction R in such a state that the phases of these position signals different from each other by 90° as shown in FIG. 18B. The position of the head in the radial direction is divided into regions RA1, RA2, RA3 and RA4, the region RA2 being a region in the vicinity of a central axis of a track with an address of an even number and $U_Y > 0$, RA4 a region in the vicinity of a central axis of a track with an address of an odd number and $U_Y < 0$, RA1 a region between central axes of adjacent tracks and $U_X < 0$, and RA3 a region between central axes of adjacent tracks and $U_X > 0$. In this case, the position signal $U_Y$ changes lineally in the regions RA1 and RA3 and also the position signal $U_X$ changes lineally in the regions RA2 and RA4. Thus, if the head 9 is positioned coarsely within a deviation of ±1 track width with respect to a track of a desired address, the head 9 can be finally positioned to the track by using the narrow-range track position signal in all ranges in the radial direction R.

According to the present invention, since the code rate of a track address (amount of original data/amount of data on the magnetic disk) can be increased, normal data can be recorded much more by decreasing a ratio of address patterns and also the seek speed at the high-speed seek mode can be increased.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim as our invention:

1. A track address pattern for a magnetic disk apparatus, wherein a gray code of a plurality of bits corresponding to a track address of the magnetic disk apparatus is divided per 2 bits thereof into groups, the respective groups of 2 bits are converted into codes of 3 bits, namely (001), (010), (100) or (111), depending on the value thereof, whereby the converted codes are recorded on the magnetic disk as the track address pattern.

2. A track address pattern for a magnetic disk apparatus, wherein a gray code of m bits, where m is an integer not less than 2, corresponding to a track address of the magnetic disk apparatus is divided into a code Gx of one bit and codes $Gm-2, Gm-1, \ldots, G0$ of $m-1$ bits, and the code of 1 bit is converted into codes C11, C10 of 2 bits according to a rule A and the codes of $m-1$ bits are converted into codes $C2m-1, C2m-2, \ldots, C21, C20$ of m bits according to a rule B, whereby a code which is converted from the gray code of m bits into a code of $m+2$ bits is recorded on the magnetic disk as the track address pattern, the rule A making the code C1j, where $j=0, 1$, correspond to Gx or Gx$\oplus$1, where $\oplus$ means an exclusive-OR operation, and the rule B making the code C20 correspond to G0 or G0$\oplus$1, the code C2j, where $j=1, \ldots, m-2$, to $G(j-1)\oplus Gj$ or $G(j-1)\oplus Gj\oplus 1$, and the code $C2m-1$ to $G(m-2)$ or $G(m-2)\oplus 1$, respectively.

3. A track address pattern for a magnetic disk apparatus wherein a gray code of a plurality of bits corresponding to a track address of the magnetic disk is divided into two sets, a code of one of the divided two sets is converted into a code according to the conversion rule A recited in claim 2, a code of the other set is converted into a code according to the rule B recited in claim 2, and the two codes obtained by these conversions are combined to thereby be recorded on the magnetic disk as the track address pattern.

4. A method of providing a track address pattern for a magnetic disk apparatus, comprising the steps of:

dividing a gray code of a plurality of bits corresponding to a track address of the magnetic disk apparatus per 2 bits thereof into groups, converting the respective groups of 2 bits into codes of 3 bits, namely (001), (010), (100) or (111), depending on the value thereof, and recording the converted codes on the magnetic disk as the track address pattern.

5. A method of providing a track address pattern for a magnetic disk apparatus comprising the steps of:

dividing a gray code of m bits, where m is an integer not less than 2, corresponding to a track address of the magnetic disk apparatus, into a code Gx of one bit and codes $Gm-2, Gm-1, \ldots, G0$ of $m-1$ bits, and converting the code of 1 bit into codes C11, C10 of 2 bits according to a rule A, converting the codes of $m-1$ bits into codes $C2m-1, C2m-2, \ldots, C21, C20$ of m bits according to a rule B, and recording a code which is converted from the gray code of m bits into a code of $m+2$ bits on the magnetic disk as the track address pattern, wherein the rule A making the code C1j, where $j=0, 1$, correspond to Gx or Gx$\oplus$1, were $\oplus$ means an exclusive-OR operation, and the rule B making the code C20 correspond to G0 or G0$\oplus$1, the code C2j, where $j=1, \ldots, m-2$, to $G(j-1)\oplus Gj$ or $G(j-1)\oplus Gj\oplus 1$, and the code $C2m-1$ to $G(m-2)$ or $G(m-2)-1$, respectively.

* * * * *